Oct. 5, 1948.  P. HALPERT  2,450,427
SERVO UNITS FOR AUTOMATIC PILOTS
Original Filed May 15, 1942
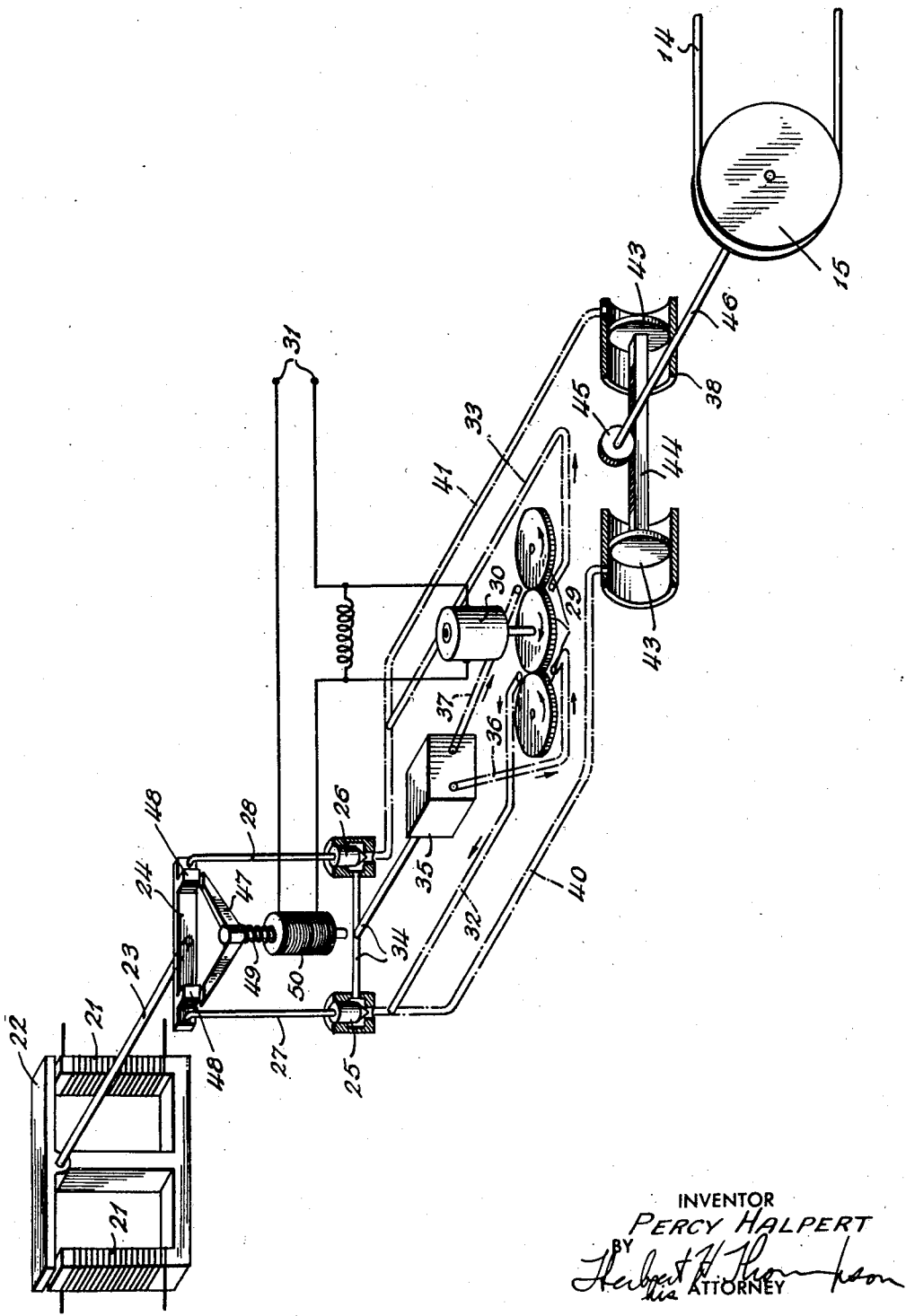
INVENTOR
PERCY HALPERT
BY
his ATTORNEY Patented Oct. 5, 1948

2,450,427

UNITED STATES PATENT OFFICE 2,450,427

SERVO UNITS FOR AUTOMATIC PILOTS

Percy Halpert, Hempstead, N. Y., assignor to The Sperry Corporation, a corporation of Delaware Original application May 15, 1942, Serial No. 443,146, now Patent No. 2,392,381, January 8, 1946. Divided and this application December 18, 1945, Serial No. 635,710

5 Claims. (Cl. 60—52)

The present divisional application is based on subject matter relating to automatic pilots for aircraft contained in U. S. Letters Patent 2,392,381, issued January 8, 1946.

The primary feature of this invention resides in the centralizing device provided for the control valve parts of the servo unit for the automatic pilot.

Other features and structural details of the invention will be apparent from the following description when read in connection with the accompanying drawing wherein the single figure shows a schematic diagram illustrating, in exploded relation, the component parts of a servo motor control unit constructed in accordance with the present invention.

With reference to the drawing, the servo unit of the automatic pilot is shown to include a controlling torque motor whose stator windings 21 are fed by an electrical signal from an elevator servo amplifier circuit of the character particularly described in the copending application of George P. Bentley and Carl A. Frische, Serial No. 259,178, filed March 1, 1939, now Patent No. 2,432,502, and not shown herein. The armature 22 of the controlling magnetic motor is mounted to rock about an axis 23 to position the rocker arm 24 and the respective valves 25 and 26 which are pivotally connected to the arm 24 at opposite ends of the same by means of the valve stems 27 and 28. The servo unit of the automatic pilot also includes, in the present instance, a three gear type pump, indicated at 29, which is driven by a motor 30 that is energized from a suitable source of electrical energy, as indicated at 31. As shown, pump 29 delivers oil or other fluid to the respective valves 25 and 26 by way of fluid circuits or pipes 32 and 33, the return flow of the fluid to which the valves offer but small resistance in their normal positions being made by way of the common pipe 34, sump 35 and pump intake pipes 36 and 37. The outlet pipes of the pump 29 also communicate with the respective ends of a servo cylinder 38. Such connection is accomplished as shown by the respective pipes 40 and 41. It will be understood that movement of pistons 43 results from a change in the normally balanced pressure in opposite sides of the main servo cylinder 38. Control over the servo unit is exercised by the torque motor whose coils or windings 21 are connected across the output of an amplifier circuit which normally applies the same voltage across each coil. The magnetic armature 22 consequently is affected by equal and opposite torque and therefore exerts no force to tend to close either of the valves 25 or 26. When the signal for the torque motor is unbalanced, the armature 22 is rocked and the valves 25 and 26 moved correspondingly which differentially restricts the free flow of fluid from the pump 29 through the valves and sump 35 back to the pump. The pump consequently builds up a pressure to overcome the restriction caused by unbalancing of the valves which results in the controlling movement of the pistons 43. Piston movement of the main cylinder 38 is communicated directly to drum 15 by way of the piston connecting rack 44, pinion 45 and driving shaft 46.

When automatic flight control is not required, it is desirable that the pilot be able to effect manual movement of the pistons 43 without opposition since the rack engaging pinion 45 for pistons 43 is mechanically connected to the craft's cable system 14. In accordance with the teaching of the present invention such a result is obtained without using an additional oil by-pass by a means for centralizing the differential controlling valves 25 and 26 of the servo unit. As shown, means are provided in the form of a forked arm 47 whose spread ends engage the undersurface of two spaced blocks 48 rigidly mounted on the rocker arm 24. Engagement of arm 47 with blocks 48 is effected by means of spring 49 which urges the parts into a position to centralize the rocker 24 and valves 25 and 26. The spring 49 is rendered normally ineffective by means of solenoid 50 which is situated in series in the circuit supplying the pump motor 30. The central stem of the forked arm 47 provides an armature for the solenoid 50 which is effective as long as energy is supplied to drive the pump motor to disable the spring 49 and permit the servo motor to respond to signals for automatic flight. When the circuit to the pump motor 30 is opened, the pump ceases functioning and the solenoid 50 is no longer energized, which restores the system to the control of the spring 49 which is then effective to centralize the rocker arm 24 with the valves 25 and 26 in their full open position, the effect of the spring overcoming in a positive manner the torque motor armature to which the arm 24 is directly connected. This permits the fluid to by-pass freely through the control valves as soon as the power to the pump drive motor is removed.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In automatic pilots for aircraft having an hydraulic servo unit supplied by a continuously operating pump and operated through two fluid circuits controlled by differentially movable valves mounted on a rocker arm, automatic means operable through the arm for moving the valves from a central position to unbalance the fluid circuits, normally ineffective means for positively centralizing the rocker arm of the valves, and means for rendering said centralizing means effective upon stoppage in the continuity of operation of the pump.

2. In automatic pilots for aircraft having an hydraulic servo unit supplied by an electrically driven, continuously operating, pump and operated through two fluid circuits controlled by differentially movable valves mounted on a rocker arm, a torque motor for moving the valves by way of the rocker arm from a central position to unbalance the fluid circuits, automatic means for controlling said torque motor, normally ineffective means for positively centralizing the rocker arm of the valves, and means for rendering said centralizing means effective upon disablement of the electric supply to the pump.

3. An automatic pilot for aircraft, as claimed in claim 2, in which the normally ineffective means for positively centralizing the rocker arm comprises a spring.

4. An automatic pilot for aircraft, as claimed in claim 2, in which the means for rendering the centralizing means effective comprises a solenoid.

5. An automatic pilot for aircraft having a fluid servo unit supplied by a motor driven, continuously operating, pump and operated through two fluid circuits controlled by differentially movable valves mounted on a rocker arm, a torque motor for moving the valves by way of the rocker arm from a central position to unbalance the fluid circuits, automatic means for controlling said torque motor, a normally ineffective spring for positively centralizing the rocker arm of the valves, a motor circuit, and a solenoid, situated in said motor circuit, operable to render said spring effective when said circuit is opened.

PERCY HALPERT.

REFERENCES CITED

The following references are of record in the file of this patent:

UNITED STATES PATENTS

| Number | Name | Date |
| --- | --- | --- |
| 2,398,421 | Frische et al. | Apr. 16, 1946 |

FOREIGN PATENTS

| Number | Country | Date |
| --- | --- | --- |
| 538,526 | Great Britain | Aug. 7, 1941 |